Figure 1:
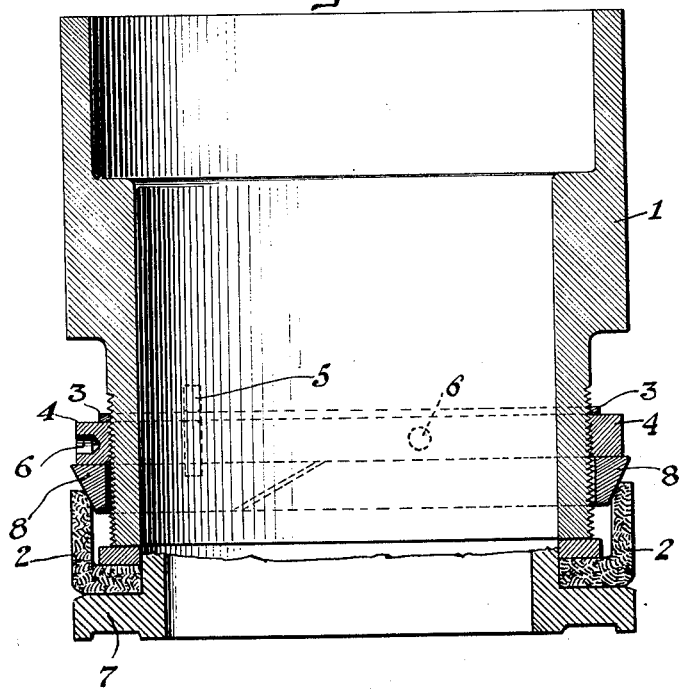

Aug. 3, 1926.

E. L. BEECHER 1,594,349

EXPANDER MECHANISM FOR CUP WASHERS

Filed Oct. 29, 1924

INVENTOR
Eugene L. Beecher
BY
Cooper Kerr & Dunham
his ATTORNEYS

Patented Aug. 3, 1926.

1,594,349

UNITED STATES PATENT OFFICE.

EUGENE L. BEECHER, OF NEW HAVEN, CONNECTICUT, ASSIGNOR TO THE WESTINGHOUSE AIR SPRING COMPANY, A CORPORATION OF PENNSYLVANIA.

EXPANDER MECHANISM FOR CUP WASHERS.

Application filed October 29, 1924. Serial No. 746,474.

My invention relates to expander devices for cup washers useful in the arts generally and particularly in air spring devices now well known in the art.

For efficient operation of air springs and the like, it is essential that the cup washer fit snugly and uniformly against the cylinder wall at all points.

The object of this invention is to provide internal pressure on cup washers to hold them against the co-operating cylinder wall irrespective of wear or work.

Another object of my invention is to provide an expander mechanism to meet the existing characteristic of the individual cup during the assembly of the air spring, for example, and one having a minimum number of parts, and in which structure the usual flat or coiled spring is omitted.

By way of illustration, I have shown in the accompanying drawing a vertical section of the plunger portion of an air spring, although it will be understood that my invention is not limited to use with such devices.

In the drawing, 1 is a support, such as a plunger wall, provided with a cup washer 2 seated on a shoulder 7 of said support. A split expander ring having a beveled face co-operating with the upper edge of the cup washer 2 is shown at 8. If desired, the split ring 8 is provided with a lap joint at its split portion. A follower ring 4 in screw threaded engagement with a portion of the cup washer support is screwed down on the split ring 8 by a suitable tool engaging with the holes 6, 6 to the point where the cup washer is in contact with its co-operating cylinder wall of the desired degree, and thereafter the inherent expansion capacity of the expander ring 8 will readily compensate for wear of the cup washer 2. The collar 4 at its upper portion is reduced in diameter, as shown at 3, to permit the said portion contiguous to the slot 5 being forced into said slot, when the desired adjustment has been made, for the purpose of locking the collar in position, thus preventing vertical movement of the various parts and retaining said ring in its normal plane.

The above construction of cup washer expander mechanism has been found to work efficiently and prevents vertical stretching and compressing of the cup washer when excessive friction is encountered in operation; permits of flexibility in the assembly operation in that the operator can adjust the pressure to the right degree on a pliable cup washer and again to the right degree on a cup washer which is less pliable or more pliable than the one before, thus producing uniformity in friction in the quantity production of air spring devices.

As no coil or flat springs are utilized in the present expander mechanism, the finished devices are free from the faults of said spring expanders in that the expander ring cannot tip or tilt and the cup washer cannot stretch or compress in service, and a uniform pressure is maintained on the cup washer at all points in contact with the expander ring.

I claim as my invention:

1. In an expander for a cup washer, a split ring which has an upper outer diameter greater than and a lower outer diameter less than the diameter of the inner lateral face of the cup washer, and is adapted to be expanded transversely of the axis of the washer, a follower in contact with the upper part of said split ring and means on said follower for locking said follower in place.

2. In an expander mechanism, a cup washer and a support therefor, a split ring which has an upper outer diameter greater than and a lower outer diameter less than the diameter of the inner lateral face of the cup washer, and which is adapted for expanding transversely of the axis of the washer, a follower member in engagement with the split ring, and means on said follower for locking it on the said support.

3. In an expander mechanism, a cup washer and a support therefor, a split ring which has an upper outer diameter greater than and a lower outer diameter less than the diameter of the inner lateral face of the cup washer, and which is adapted for expanding transversely of the axis of the washer and in engagement with said cup washer, a follower in screw threaded engagement with said support and bearing on said split ring.

4. In an expander mechanism, a cup washer, and a support therefor, a split ring which has an upper outer diameter greater than and a lower outer diameter less than the diameter of the inner lateral face of the cup washer, and which is adapted for expanding transversely of the axis of the washer and in engagement with said cup washer, a follower in screw threaded engagement with said support and bearing on said split ring, and means on said follower for locking it to said support.

In testimony whereof I hereto affix my signature.

EUGENE L. BEECHER.